United States Patent [19]

Schnedl

[11] Patent Number: 4,942,669

[45] Date of Patent: Jul. 24, 1990

[54] DIPSTICK LOCATOR AND WIPER CONSTRUCTION FOR AUTOMOBILES

[76] Inventor: Edwin F. Schnedl, 614 South View Ter., Alexandria, Va. 22314

[21] Appl. No.: 416,583

[22] Filed: Oct. 3, 1989

[51] Int. Cl.⁵ ............................................. G01F 23/04
[52] U.S. Cl. ........................................ 33/725; 33/726
[58] Field of Search ................. 33/725, 726, 727, 728, 33/729, 730, 731, 722, 721

[56] References Cited

U.S. PATENT DOCUMENTS

| | | |
|---|---|---|
| 3,460,181 | 8/1969 | Denver . |
| 3,630,083 | 12/1971 | Gorans . |
| 4,017,935 | 4/1977 | Hernandez . |
| 4,110,909 | 9/1978 | Mayr et al. . |
| 4,155,167 | 5/1979 | DeLano . |
| 4,510,690 | 4/1985 | Attler . |
| 4,558,520 | 12/1985 | Forde, Jr. . |
| 4,640,126 | 2/1987 | Jansch . |
| 4,796,470 | 1/1989 | Lahde . |
| 4,806,902 | 2/1989 | Gana . |
| 4,860,401 | 8/1989 | Deveaux ............................ 33/729 X |

FOREIGN PATENT DOCUMENTS

| | | | |
|---|---|---|---|
| 2547177 | 5/1977 | Fed. Rep. of Germany | ........ 33/725 |
| 1099373 | 9/1955 | France | ................................... 33/722 |

Primary Examiner—Harry N. Haroian
Attorney, Agent, or Firm—Richard P. Matthews

[57] ABSTRACT

An apparatus for locating and guiding a dipstick used to measure the level of oil in a crankcase of an automobile engine and for wiping excess or residual oil from the dipstick. For existing vehicles, an adaptor is provided which is secured to the exterior of a dipstick tube. The adaptor has a lower section which engages the dipstick tube, an intermediate seciton to receive a cap member for the tube, and an upwardly extending funnel-shaped top section serving as an easy locator for the lower end of the dipstick. The upper edge of the funnel-shaped top section is provided with one or more wiper slots to wipe residual oil from the dipstick. For new automobiles, the dipstick tube is formed with a flared-funnel top which preferably terminates in a cylindrical vertical wall in which at least one wiper slot is provided. The handle of the dipstick is provided with a plug-like member from which the dipstick is subtended and which also carries a cover member to prevent excessive oil contamination.

6 Claims, 2 Drawing Sheets

DIPSTICK LOCATOR AND WIPER CONSTRUCTION FOR AUTOMOBILES

This invention relates to a dipstick and wiper construction for measuring the depth of oil presently in the crankcase of internal combustion engines.

BACKGROUND OF THE INVENTION

Heretofore it has been known either to provide locator means for a dipstick or to provide wiper means for removing residual oil thereby cleaning the dipstick so that an accurate reading of the present level of oil can be obtained. The devices that have been used have in general been too cumbersome and/or complex so that they have not been adopted for any vide scale usage by the industry. The devices also have concentrated on a single function; that is, either the locating function or the cleaning/wiping function, but not both.

SUMMARY OF THE INVENTION

In accordance with the present invention the foregoing limitations and shortcomings of the known prior art have been effectively overcome. In particular, the present invention comprises an easily installed dipstick locator device which also includes one or more wiping slots directly built into the locator means. The invention is presented in two forms—one for incorporation into new cars and one for existing vehicles. For new cars, a funnel-shaped member is combined directly with a dipstick tube. The dipstick itself carries a cover member for the funnel-shaped member so as to prevent excessive oil contamination. In a preferred embodiment, the funnel-shaped member which serves to locate and guide the dipstick is provided with a plurality of wiper slots in a vertically extending cylindrical portion atop the funnel-shaped member.

For used or already manufactured vehicles, an adaptor is provided which has a lower section which telescopes over and frictionally engages the exterior of a conventional dipstick tube. An intermediate section is enlarged with respect to the lower section to accommodate a conventional cap member for the dipstick tube. An upwardly extending funnel-shaped top section for the adaptor serves as an easy locator and guide for the lower end of the dipstick. The upper edge of the funnel-shaped top section is provided with a plurality of wiper slots for purposes of cleaning the dipstick by wiping residual oil from the dipstick.

In order to make the adaptor both functional and salable, it is preferred to keep the lateral dimensions thereof as small as possible. To facilitate this end result, the minimum diameter for the funnel-shaped top section is made somewhat smaller than the diameter of the cap member carried by the dipstick. This feature necessitates that expansion means be provided between the lower portion of the funnel-shaped top section and the intermediate section of the adaptor. In a preferred form of the invention the required expansion is provided by a series of vertically extending slots between the top section and the intermediate section.

The inherent improvement and advantages of the present invention will become more readily apparent by reference to the following detailed description of the invention and by reference to the accompanying drawings wherein.

DETAILED DESCRIPTION OF THE INVENTION

Figure 1:
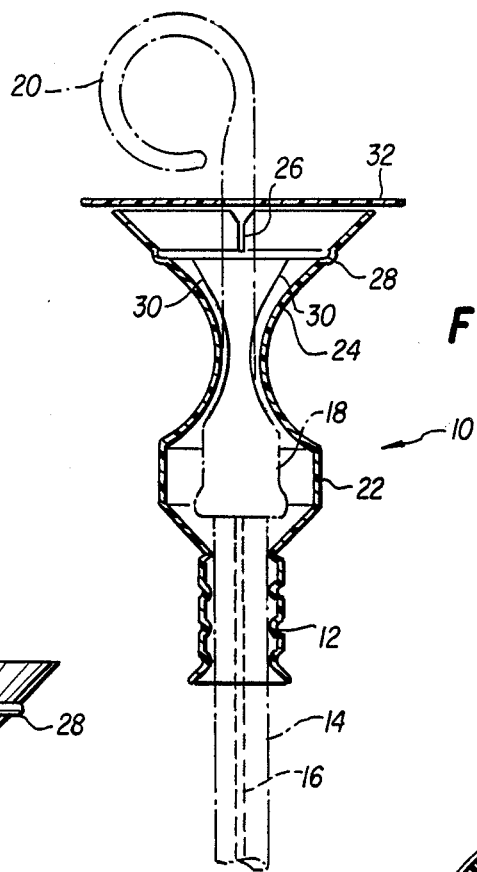
FIG. 1 is an elevational view, taken in vertical cross section, showing the dipstick locator and wiper construction of the present invention.

Referring now to FIG. 1 of the drawings, there is illustrated an adaptor shown generally at 10. Adaptor 10 is provided with a lower section 12 which frictionally engages or is otherwise secured to the exterior of a dipstick tube shown in phantom at 14. Also shown in phantom are conventional elements of a dipstick 16, a cap member 18 secured to the upper end of dipstick tube 14, and a handle 20.

Figure 2:
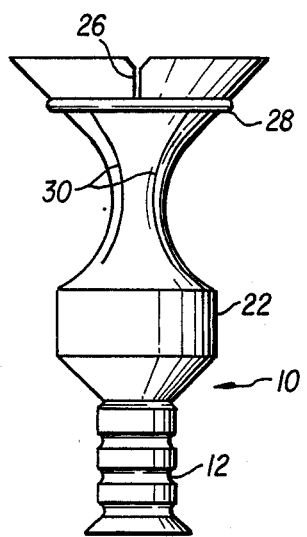
FIG. 2 is an elevational view of the adaptor shown in FIG. 1.
Figure 3:
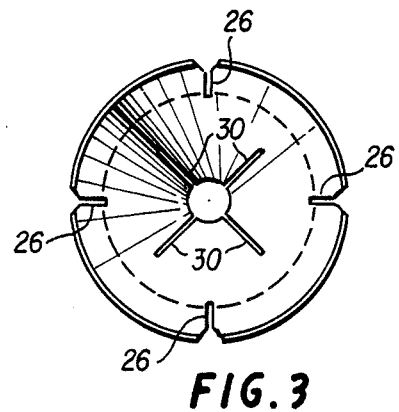
FIG. 3 is a top plan view of the adaptor shown in FIG. 1.

Adaptor 10 also has an intermediate section 22 which is somewhat enlarged so as to accommodate cap member 18. In order to locate and guide the dipstick into the dipstick tube 14, a funnel shaped top section 24 is provided for adaptor 10. Since it is desired to make the adaptor's lateral dimensions as small as possible, while still providing a satisfactory target for the end of the dipstick, the minimum diameter of the funnel-shaped top section 24 is made somewhat smaller than the diameter of cap member 18. This requires that the adaptor be expandable to facilitate the entry and exit of the dipstick 16 and cap member 18. Because of this desirable feature, it becomes necessary to provide expansion means in the region of the lower portion of the funnel-shaped top section 24 and the intermediate section 22. For this purpose, expansion slots 30 are provided which extend vertically in the adaptor member as is illustrated in FIGS. 1–3. To increase rigidity, a strengthening rib 28 is illustrated in FIGS. 1 and 3 which encircles the adaptor 10 in a horizontal plane immediately below slots 30.

In order to prevent excessive contamination of the interior of adaptor 10, it is preferred to use a cover member 32 slotted at 34 to permit its ready attachment to the handle portion at 20 as is illustrated in FIG. 1.

Figure 5:
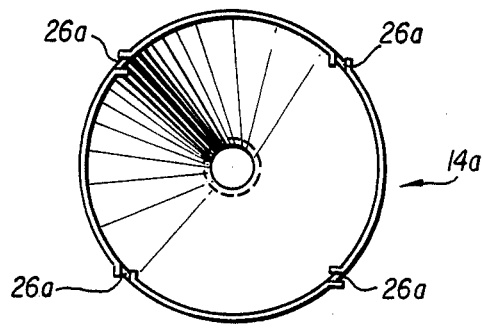
FIG. 5 is a top plan view of another embodiment of the invention.
Figure 6:
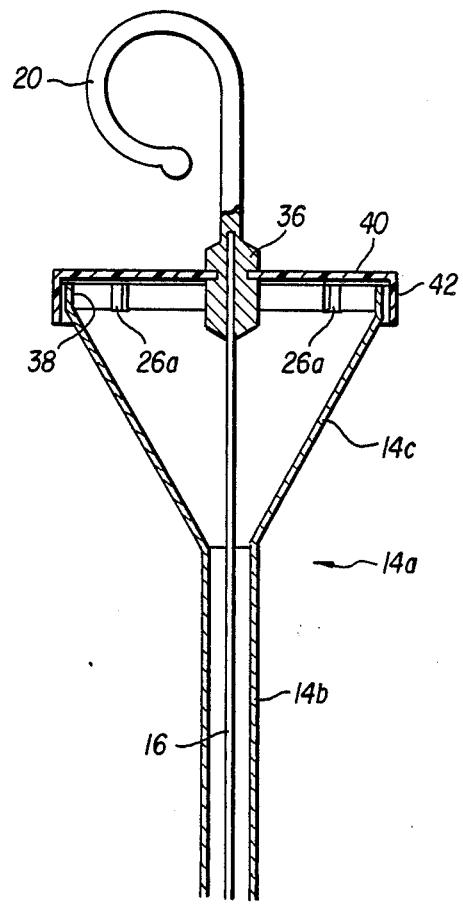
FIG. 6 is a fragmentary elevational view, taken partially in vertical cross section, showing the embodiment of FIG. 5 in combination with a dipstick and cover member.

Referring now to FIGS. 5 and 6, there is illustrated a modified form of the invention which is intended for use in the manufacture of new automobiles. In these figures, a modified dipstick tube is shown at 14a which includes a tubular portion 14b and a flared funnel portion 14c. The flared funnel portion 14c may be made integral with tubular portion 14b or securely attached thereto.

In this form of the invention, a plug-like member 36 is disposed at the lower end of handle 20 into which the dipstick 16 is inserted and permanently retained. Also carried or anchored by this plug-like member 36 is a cover member 40 which is provided with a depending annular skirt 42 to prevent excessive contamination of oil in the crankcase of the vehicle.

The flared-funnel top 14c terminates in a cylindrical vertical wall 38 which is provided with a plurality of wiper slots therein which extend in a vertical direction. These wiper slots provide a readily available means to clean the lower end of the dipstick as it is removed from the dipstick tube 14b prior to re-entry thereof in order to obtain a reading of the level of oil within the crankcase. In the alternative, it is possible to eliminate the cylindrical vertical wall 38 and terminate the flared-funnel top 14c in the same manner as shown in FIGS. 1-3 with slots 26a communicating with the upper surface of the flared-funnel top 14c.

For purposes of illustration and without limitation, it is preferred to make the adaptor of FIGS. 1-3 from molded polyvinylchloride with a thickness of about 1/32 inch. The open-mouth upper diameter of the adaptor is approximately 1¾ inches which provides an adequate target for locating and guiding the end of the dipstick tube. The minimum diameter of the flared funnel portion of the adaptor in FIGS. 1-3 for use with a dipstick tube of approximately ⅜ inches in diameter is 9/32 of an inch. The flattened vertical portion of the intermediate section 22 is approximately ⅜ inch long in order to accommodate the cap member 18. It is possible to use strap members, spring clips or other means to secure the lower section 12 of adaptor 10 to the exterior of the dipstick tube 14. The walls of the lower section of the funnel-shaped top section are struck on a radius of about ⅝ inch from a center substantially in line with the outer edge of the upper wall portion of the funnel. The upper walls of the funnel 24 form an angle of approximately 45 degrees with respect to the horizontal.

Figure 4:
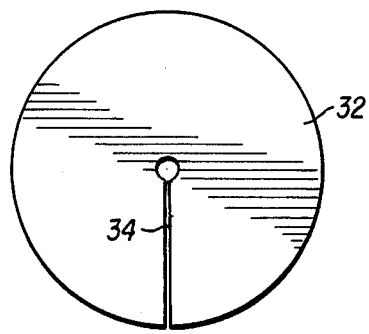
FIG. 4 is a top plan view of a cover member shown in FIG. 1.

The material of the flared funnel portion 14c in FIG. 6 may be made of the same metallic material as the tubular portion 14b of the dipstick tube 14a. The materials for the cover 32 in FIG. 4 and 40 in FIG. 6 may be vinyl or other material which will withstand the temperature requirements found in the environment of internal combustion engines.

While the invention has been illustrated and described with respect to preferred embodiments thereof, it will be recognized that the invention may be otherwise variously embodied and practiced within the scope of the claims which follow:

I claim:

1. In a dipstick locator and wiper construction for automobiles, the combination comprising:
   a. an adaptor to be attached externally of a dipstick tube into which said dipstick is inserted, said adaptor having
      i. a lower section for frictional engagement with the exterior of said dipstick tube,
      ii. an intermediate section to accommodate a cap member positioned at the upper end of said dipstick,
      iii. and an upwardly extending funnel-shaped top section serving as an easy locator for the lower end of said dipstick,
         (a) said funnel-shaped top section terminating in an upper surface from which at least one wiper slot extends downwardly therefrom providing means to wipe residual oil from said dipstick.

2. In a dipstick locator and wiper construction for automobiles as defined in claim 1 including means to provide expansion between the lower portion of said funnel-shaped top section and said intermediate section to facilitate easy ingress and exit of said dipstick and cap member into and out of said adaptor.

3. In a dipstick locator and viper construction for automobiles as defined in claim 2 wherein said means to provide expansion between the lower portion of said funnel-shaped top section and said enlarged intermediate section consists of a series of vertically extending slots between said sections.

4. In a dipstick locator and wiper construction for automobiles as defined in claim 1 including means to prevent excessive contamination of oil for said automobile through said upwardly extending funnel-shaped top section.

5. In a dipstick locator and wiper construction for automobiles as defined in claim 4 wherein said means to prevent excessive contamination of oil consists of a cover member for said funnel-shaped top section which cover member is carried by said dipstick.

6. In a dipstick locator and wiper construction for automobiles, the combination comprising:
   a. a dipstick tube formed with a flared-funnel top,
      i. said flared-funnel top terminating in a cylindrical vertical wall and being provided with at least one wiper slot in said cylindrical vertical wall,
   b. and a dipstick for insertion into said dipstick tube located and guided by said flared-funnel top,
      i. said dipstick having a handle at its upper end,
      ii. and said dipstick carrying a cover member for covering said flared-funnel top and preventing excessive oil contamination.

* * * * *